United States Patent
White et al.

(10) Patent No.: US 10,801,346 B2
(45) Date of Patent: Oct. 13, 2020

(54) COMBUSTOR FINGER SEAL

(71) Applicant: UNITED TECHNOLOGIES CORPORATION, Farmington, CT (US)

(72) Inventors: Kevin W. White, Jupiter, FL (US); Henry K. Webster, Jupiter, FL (US); Jonathan Ariel Scott, Southington, CT (US); Randall J. Brown, East Windsor, CT (US); Alan D. Lees, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 711 days.

(21) Appl. No.: 15/225,179

(22) Filed: Aug. 1, 2016

(65) Prior Publication Data
US 2018/0030844 A1 Feb. 1, 2018

(51) Int. Cl.
*F01D 11/00* (2006.01)
*F16J 15/08* (2006.01)
(Continued)

(52) U.S. Cl.
CPC ............ *F01D 11/003* (2013.01); *F01D 9/023* (2013.01); *F01D 11/005* (2013.01); *F02C 3/14* (2013.01); *F02C 7/28* (2013.01); *F16J 15/0887* (2013.01); *F05D 2220/32* (2013.01); *F05D 2230/60* (2013.01); *F05D 2240/35* (2013.01); *Y02T 50/672* (2013.01); *Y02T 50/675* (2013.01)

(58) Field of Classification Search
USPC ........................................................ 60/805
See application file for complete search history.

(56) References Cited

U.S. PATENT DOCUMENTS

| 4,645,217 A | 2/1987 | Honeycutt, Jr. |
| 2008/0080968 A1* | 4/2008 | Guentert ............... F01D 11/005 415/134 |
| 2012/0200046 A1 | 8/2012 | Green |

FOREIGN PATENT DOCUMENTS

| EP | 2930312 | 10/2015 |
| WO | 2016068857 | 5/2016 |

OTHER PUBLICATIONS

European Patent Office, European Search Report dated May 4, 2018 in Application No. 17178467.1-1006.
(Continued)

*Primary Examiner* — Mark A Laurenzi
*Assistant Examiner* — Loren C Edwards
(74) *Attorney, Agent, or Firm* — Snell & Wilmer L.L.P.

(57) ABSTRACT

An annular finger seal includes a base portion defining a base edge of the annular finger seal and having a center pass-through aperture. The base edge may be substantially continuous. The annular finger seal may also include a finger portion defining a finger edge of the annular finger seal and including a plurality of fingers. The finger edge may be segmented by gaps disposed between adjacent fingers of the plurality of fingers. A gas turbine engine includes a combustor section, a turbine section, and an annular finger seal. The annular finger seal includes a plurality of fingers and the annular finger seal is disposed at an adjoining interface between the combustor section and the turbine section. The annular finger seal may be mounted to the turbine section and may engage a radially inward facing surface, relative to the engine central longitudinal axis, of the combustor section.

15 Claims, 6 Drawing Sheets

(51) Int. Cl.
*F01D 9/02* (2006.01)
*F02C 3/14* (2006.01)
*F02C 7/28* (2006.01)

(56) References Cited

OTHER PUBLICATIONS

European Patent Office, European Search Report dated Aug. 12, 2019 in Application No. 17178467.1.

* cited by examiner

COMBUSTOR FINGER SEAL

FIELD

The present disclosure relates to gas turbine engines, and more specifically, to the interface between the combustor section and the turbine section.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The high temperature of the combustion gases produced in the combustor section results in thermal-induced relative radial movement between the combustor section and the turbine section. Such relative radial movement between the combustor section and the turbine section can result in unwanted leakage of hot combustion gases and/or wear on associated components.

SUMMARY

In various embodiments, an annular finger seal is disclosed herein. The annular finger seal may include a base portion defining a base edge of the annular finger seal and having a center pass-through aperture. The base edge may be substantially continuous. The annular finger seal may also include a finger portion defining a finger edge of the annular finger seal and including a plurality of fingers. The finger edge may be segmented by gaps disposed between adjacent fingers of the plurality of fingers.

In various embodiments, a plurality of arcuate sections collectively form the annular finger seal, wherein the base portion is a first base portion and the finger portion is a first finger portion of a first arcuate section of the plurality of arcuate sections. According to various embodiments, the plurality of arcuate sections may be made from a composite material having a first ply and a second ply. The annular finger seal may include a second arcuate section of the plurality of arcuate sections, wherein the first ply and the second ply of each of the first arcuate section and the second arcuate section may be circumferentially offset relative to each other such that a first circumferential edge of the first arcuate section shiplaps a second circumferential edge of the second arcuate section. In various embodiments, the base portion includes a second aperture. The center pass-through aperture and the second pass-through aperture may be circumferentially spaced apart and the center pass-through aperture may have a radial dimension that is greater than the second pass-through aperture. In various embodiments, the center pass-through aperture may have a circumferential dimension that is less than the second pass-through aperture.

According to various embodiments, the gaps may include circumferentially alternating first gaps and second gaps, wherein the first gaps extend a first distance from the finger edge towards the base edge and the second gaps extend a second distance, different than the first distance, from the finger edge towards the base edge. In various embodiments, the annular finger seal may include a bend such that the base portion extends in a first direction and the finger portion extends in a second direction different than the first direction. For example, an angle between the first direction and the second direction may be between about 75 and 100 degrees. In various embodiments, first gaps extend through the bend and the second gaps terminate in the finger portion before the bend. In various embodiments, the gaps terminate in a keyhole formation. In various embodiments, a circumferential dimension of the gaps tapers as the gaps extend from the finger edge towards the base edge. The finger portion may have an "s" shape.

Also disclosed herein, according to various embodiments, is a gas turbine engine having an engine central longitudinal axis. The gas turbine engine includes a combustor section, a turbine section, and an annular finger seal. The annular finger seal includes a plurality of fingers and the annular finger seal is disposed at an adjoining interface between the combustor section and the turbine section. The annular finger seal may be mounted to the turbine section and may engage a radially inward facing surface, relative to the engine central longitudinal axis, of the combustor section.

In various embodiments, the annular finger seal may be mounted to a turbine vane of the turbine section and may engage the radially inward facing surface of a combustor transition duct of the combustor section. In various embodiments, the annular finger seal may be preloaded relative to the combustor transition duct to account for relative radial movement of the combustor transition duct such that the annular finger seal remains engaged with the radially inward facing surface of the combustor transition duct during relative radial movement of the combustor transition duct. According to various embodiments, the annular finger seal may be mounted to the turbine vane via spring fasteners. In various embodiments, the annular finger seal may be made from a resiliently flexible material.

Also disclosed herein is a method of manufacturing a gas turbine engine having an engine central longitudinal axis. The method includes mounting a base portion of an annular finger seal to a forward portion of a turbine vane and engaging a finger portion of the annular finger seal with a radially inward facing surface, relative to the engine central longitudinal axis, of an aft portion of a combustor transition duct.

In various embodiments, the annular finger seal includes a plurality of arcuate sections, wherein mounting the base portion of the annular finger seal to the forward portion of the turbine vane includes mounting the plurality of arcuate sections via spring fasteners. In various embodiments, engaging the finger portion of the annular finger seal with the radially inward facing surface of the combustor transition duct includes deflecting the finger portion of the annular finger seal into a compressed state.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, an annular finger seal for a gas turbine engine 20 is disclosed herein. In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Figure 1:
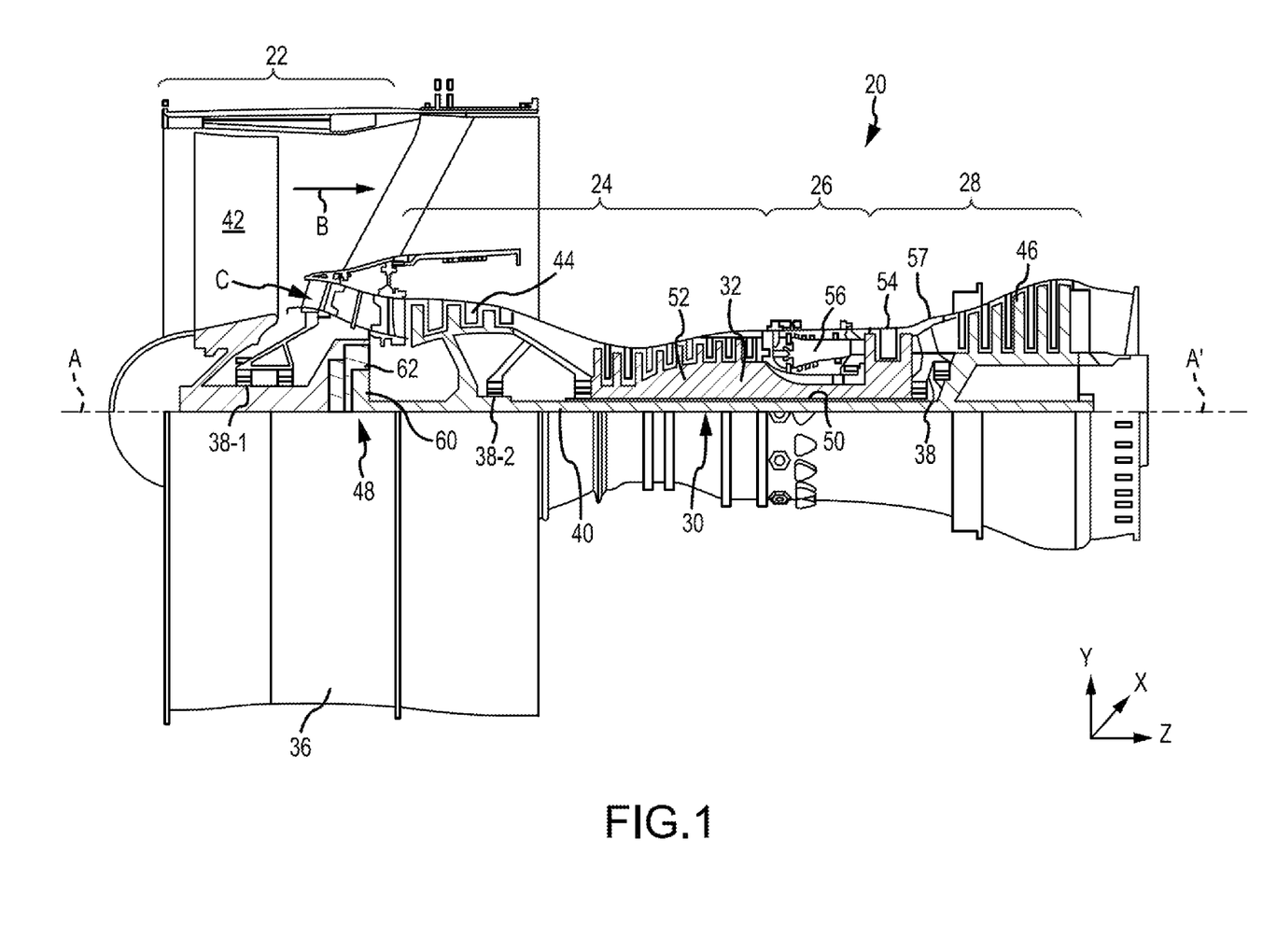
FIG. 1 illustrates a cross-sectional view of an exemplary gas turbine engine, in accordance with various embodiments.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In various embodiments, and with reference to FIG. 2-6, an annular finger seal 130 for a gas turbine engine 20 is disclosed. As described above, the gas turbine engine 20 generally includes various sections, including a combustor section 26 and a turbine section 28. The annular finger seal 130, according to various embodiments, is positioned at an adjoining interface between the combustor section 26 and the turbine section 28. Said differently, the annular finger seal 130 interfaces between an aft portion of the combustor section 26 and a forward portion of the turbine section 28. In various embodiments, the annular finger seal 130 may be mounted to the turbine section 28 and may be directly engaged with the combustor section. For example, in various embodiments the annular finger seal 130 may be mounted to a turbine vane 120 of the turbine section 28 and may be directly engaged with a combustor transition duct 110 of the combustor section 26

As mentioned above, due to the operating conditions of the gas turbine engine, such as the temperature of the hot combustion gases flowing through the combustor transition duct 110, radial movement of the combustor transition duct 110 and/or the turbine vane 120 may occur. For example, the combustor transition duct 110 and/or the turbine vane 120 may move radially outward, relative to the engine central longitudinal axis A-A'. In various embodiments, the magnitude and/or rate of the radial movement of the combustor transition duct 110 and the turbine vane 120 may be different; that is, the magnitude and/or rate of the radial movement of the combustor transition duct 110 may exceed that of the turbine vane 120. In various embodiments, if not for the annular finger seal 130 disclosed herein, the relative radial movement of the combustor transition duct 110 and the turbine vane 120 may result in excessive leakage of hot combustion gases and/or excessive wear on the associated components. Said differently, and as described in greater detail below, the annular finger seal 130 may prevent excessive leaking of hot combustion gases and may prevent excessive wear on the associated components, according to various embodiments.

The annular finger seal 130, according to various embodiments, may be made from a plurality of arcuate sections 130A, 130B that collectively form the annular finger seal 130. Accordingly, while the arcuate sections 130A, 130B may be parts of a whole (i.e. the annular finger seal 130), details and descriptions of attributes, features, properties, characteristics, or components included herein with reference to the annular finger seal 130 may be applicable to individual arcuate sections 130A, 130B, and vice-versa.

Figure 3:
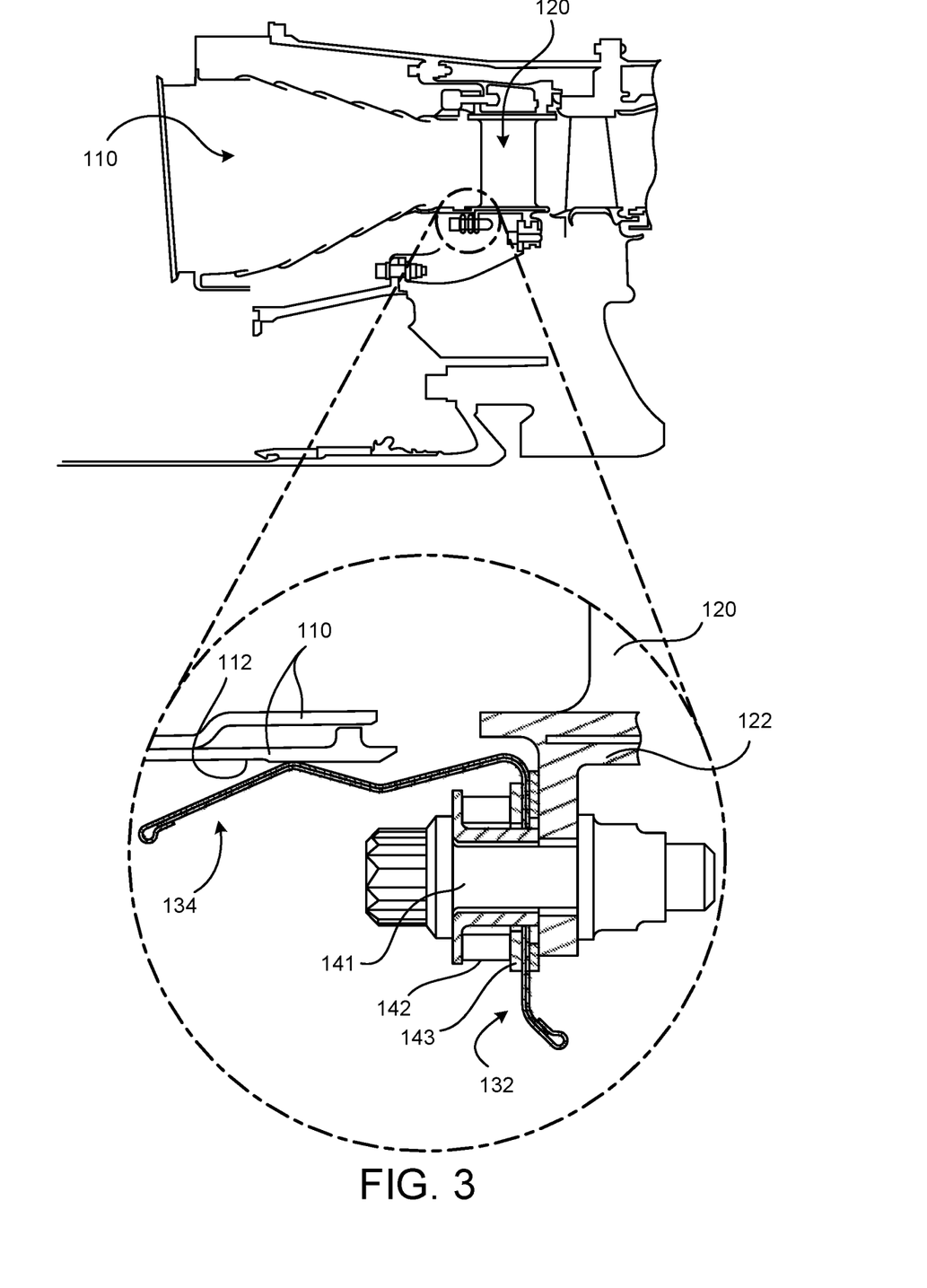
FIG. 3 illustrates a cross-sectional view, including a magnified view, of an annular finger seal mounted to a turbine section and engaging a combustor section of a gas turbine engine, in accordance with various embodiments.
Figure 4:
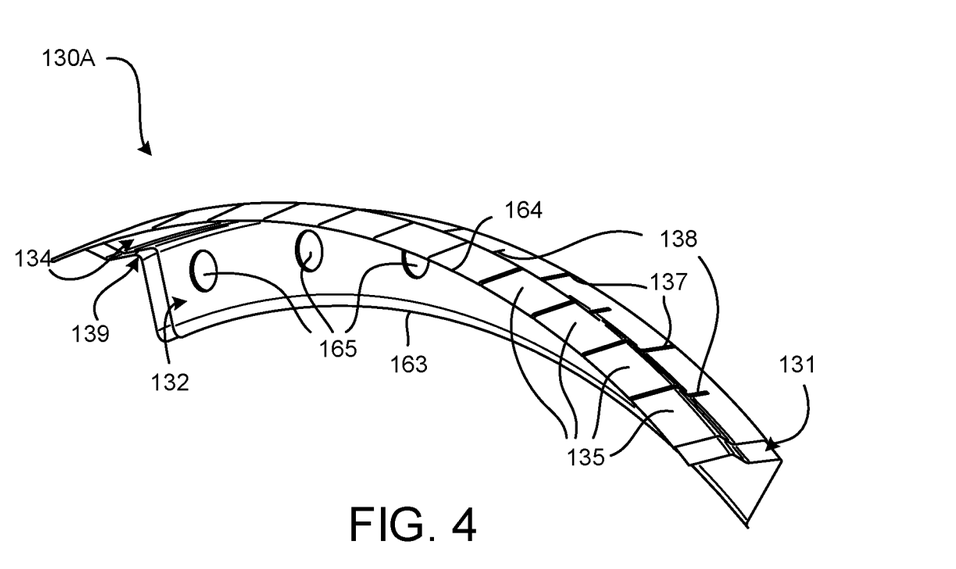
FIG. 4 illustrates a perspective view of an arcuate section of an annular finger seal, in accordance with various embodiments.

The annular finger seal 130 may include a base portion 132 and a finger portion 134 (with particular reference to FIGS. 3 and 4). The base portion 132 may be configured to be mounted to the turbine section 28, such as the turbine vane 120 or the turbine vane foot 122. In various embodiments, the base portion 132 may also have a plurality of pass-through apertures 165 through which fasteners may extend to facilitate mounting the annular finger seal 130. In various embodiments, the base portion 132 may have a base edge 163 that is substantially continuous. The finger portion 134 of the annular finger seal 130 may include a plurality of fingers 135. Gaps 136 in the finger portion 134 of the annular finger seal 130 may distinguish and partially separate adjacent fingers 135 from each other. Accordingly, in various embodiments, the finger portion 134 has a finger edge 164 that is segmented.

In various embodiments, the annular finger seal 130 may have a two-ply composite structure. For example, the annular finger seal 130 may be made from a first ply 161 and a second ply 162. In various embodiments, the annular finger seal 130, and thus the first and second plies 161, 162, may be made from a nickel based alloy and/or a cobalt based alloy, among others. For example, the annular finger seal 130 may be made from a high performance nickel-based super alloy (e.g., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y., USA). In various embodiments, the annular finger seal 130 may be made from a cobalt-nickel-chromium-tungsten alloy. In various embodiments, the material of the annular finger seal 130 may provide mechanical wear resistance, may be lubricious, and/or may be resistant to corrosion. In various embodiments, the annular finger seal 130 may include one or more surface coatings.

In various embodiments, the annular finger seal 130 may include more than two layers/plies. For example, the annular finger seal 130 may have a third ply or foil disposed between the first and second plies. The third ply may help to prevent fluid leakage between the fingers 135, according to various embodiments.

Figure 6:
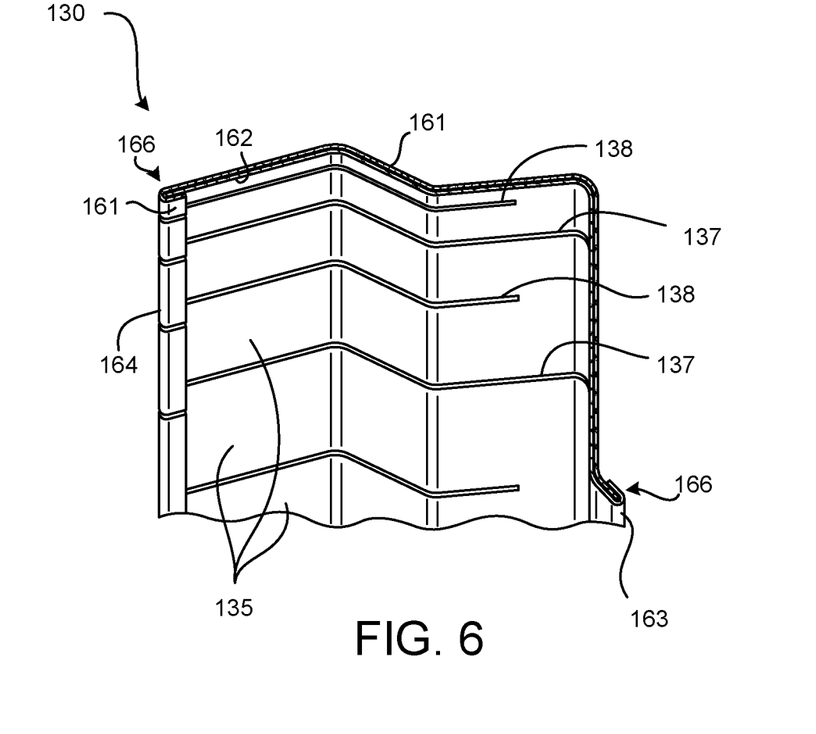
FIG. 6 illustrates a perspective cross-sectional view of an arcuate section of an annular finger seal, in accordance with various embodiments.

In various embodiments, and with reference to FIG. 6, the base edge 163 and the finger edge 164 may have a rolled-over configuration 166. Said differently, one of the two plies 161, 162 may wrap around and close the edge of the other ply. For example, in various embodiments, the first ply 161 may wrap around the terminating edge of the second ply 162 to form the finger edge 164 and the second ply 162 may wrap around the terminating edge of the first ply 161 to form the base edge 163.

In various embodiments, the annular finger seal 130 may be resiliently flexible to enable the annular finger seal 130 to be preloaded and installed in the gas turbine engine 20. That is, the fingers 135 may be resiliently deflectable and thus may operably deflect to account for the relative radial movement of the combustor transition duct 110 and the turbine vane 120. Said differently, and in accordance with various embodiments, the annular finger seal 130 may be installed in the gas turbine engine 20 such that the fingers 135 are in a partially compressed state while the gas turbine engine 20 is not in operation. In accordance with various embodiments, during operation of the gas turbine engine 20, the temperature of the hot combustion gases may cause the combustor transition duct 110 to move radially outward faster and/or to a greater extent relative to the turbine vane 120. Because of the resilient flexibility of the fingers 135 of the annular finger seal 130, the fingers 135 may deflect with the combustor transition duct 110 and thus may maintain sufficient engagement with a radially inward facing surface 112 of the combustor transition duct 110 (FIG. 3), thereby preventing excess leakage of hot combustion gases and preventing wear to the associated components. In other words, the compliance of the annular finger seal 130 is such that, during operation of the gas turbine engine 20, the annular finger seal 130 accommodates thermal and centrifugal relative movement of the combustor transition duct 110 and the turbine vane 120.

In various embodiments, the gaps 136 in the finger portion 134 of annular finger seal 130 may have different lengths. For example, the gaps 136 may include circumferentially alternating first and second gaps 137, 138 that extend first and second distances from the finger edge 164, respectively. In various embodiments, the annular finger seal 130 may have a bend 139 such that the finger portion 134 and the base portion 132 extend in substantially non-parallel directions. For example, the base portion 132 may extend substantially radially, relative to the engine central longitudinal axis, and the finger portion 134 may extend in a forward direction. In various embodiments, an angle between the extension direction of the base portion 132 and the extension direction of the finger portion 134 may be between about 75 degrees and 100 degrees, wherein the term "about" in this context is plus or minus 5 degrees.

Figure 5:
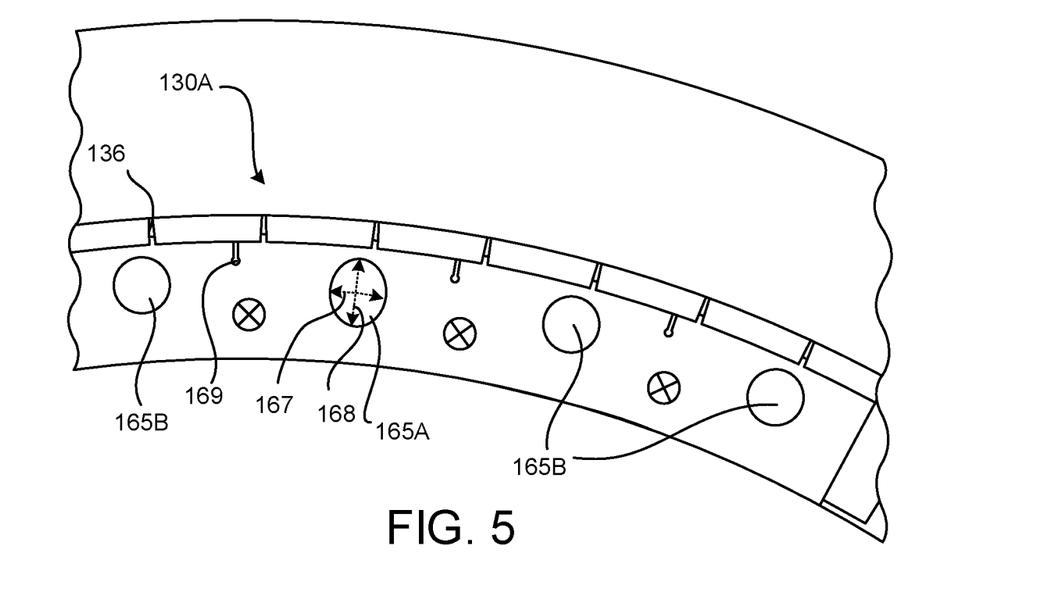
FIG. 5 illustrates a forward view of an arcuate section of an annular finger seal, in accordance with various embodiments.

In various embodiments, the first gaps 137, for example, may extend from the finger edge 164, through the bend 139, and may terminate in the base portion 132 and the second gaps 138 may terminate in the finger portion 134. The alternating length of the gaps may tend to prevent liberation of the fingers 135. In various embodiments, the gaps 136 terminate in a keyhole formation 169 (FIG. 5). In various embodiments, a circumferential dimension of the gaps 136 tapers as the gaps 136 extend from the finger edge 164 towards the base edge 163. In various embodiments, the finger portion 134 may have various bends to form an "S" shape. The shape of the finger portion 134 of the annular finger seal 130 may conform to a radially inward facing surface 112 the combustor transition duct 110 and/or may otherwise augment the ability of the annular finger seal 130 to remain engaged with the radially inward facing surface 112 despite the relative radial movement of the combustor transition duct 110 and the turbine vane 120.

Figure 2:
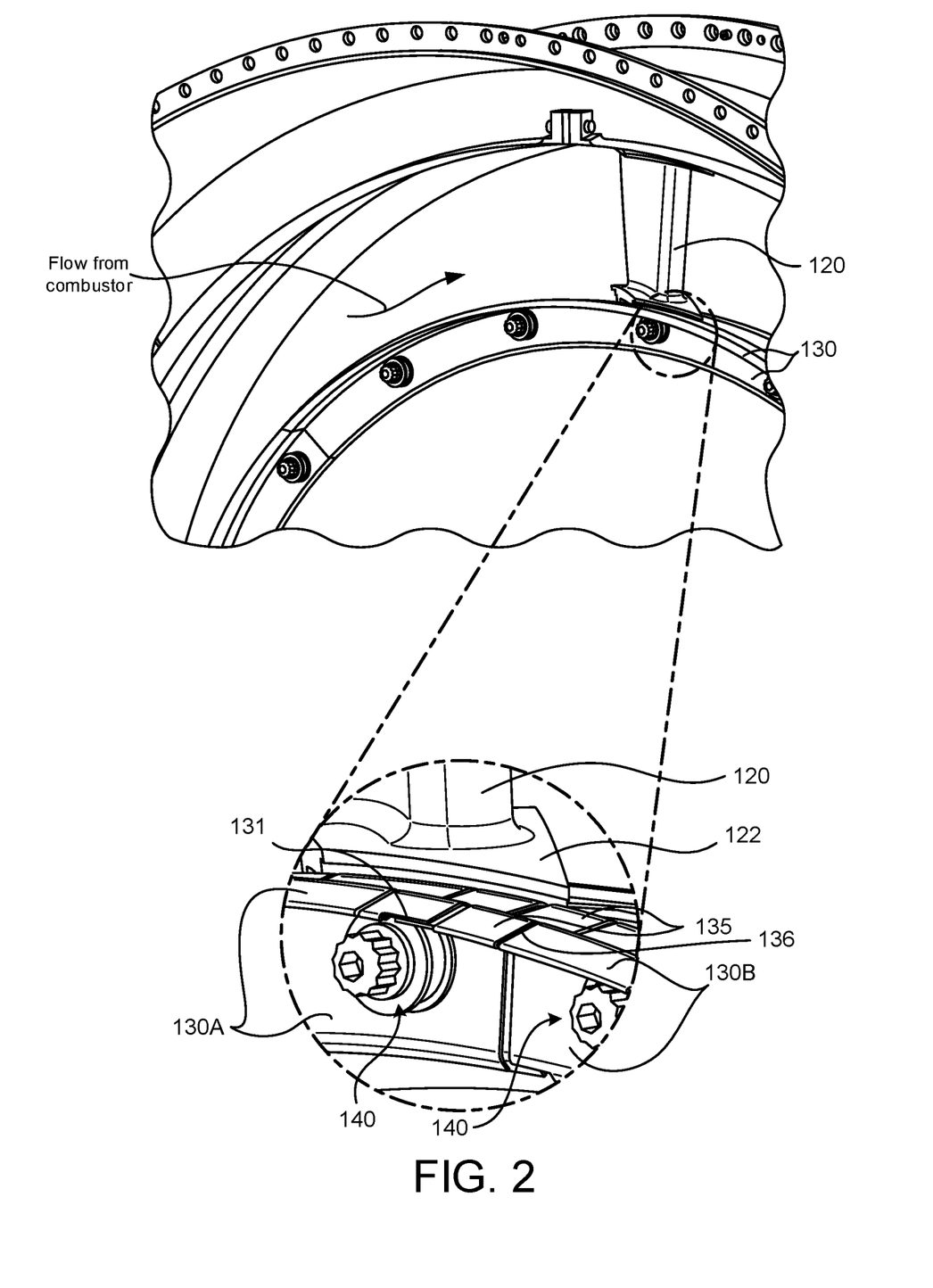
FIG. 2 illustrates a perspective view, including a magnified view, of an annular finger seal mounted to a turbine section of a gas turbine engine, in accordance with various embodiments.

In various embodiments, and with reference to FIGS. 2 and 4, opposing circumferential edges of the arcuate sections 130A, 130B may have a shiplap 131 configuration with adjacent arcuate sections. That is, adjacent arcuate sections may engage each other at respective circumferential edges by partially overlapping each other. In various embodiments, the first and second plies 161, 162 may be circumferentially offset relative to each other to form the shiplap configuration 131. In various embodiments, adjacent arcuate sections 130A, 130B may not be mechanically attached together but instead may partially overlap each other in the shiplap configuration 131, thereby preventing excess leakage of combustion gases while contributing to the accommodation of radial expansion of the annular finger seal 130. Said differently, in accordance with various embodiments, in addition to the compliant nature of the fingers 135, which accommodates relative radial movement of the combustor transition duct 110 and the turbine vane 120, the shiplap configuration 131 between adjacent arcuate sections 130A, 130B also may facilitate accommodation of relative radial movement of the combustor transition duct 110 and the turbine vane 120 by allowing the circumference of the base portion 132 to change according to the relative radial movement of the combustor transition duct 110 and the turbine vane 120.

In various embodiments, the compliance of the annular finger seal 130 may further be augmented via the means of mounting the base portion 132 of the annular finger seal 130 to the turbine vane 120. As mentioned above, and in accordance with various embodiments, the base portion 132 of the annular finger seal 130 may include a plurality of pass-through apertures 165. In various embodiments, spring fasteners 140 may extend through the pass-through apertures 165 to attached the annular finger seal 130 to the turbine vane 120. The spring fasteners 140 may include a bolt 141 and a spring feature 142 disposed between a head of the bolt 141 and a surface 143 of the turbine vane 120. Because of the non-rigid mounting configuration of the spring fasteners 140, the annular finger seal 130 may be non-rigidly attached to the turbine vane 120 and thus may allow a degree of relative movement between the annular finger seal 130 and the turbine vane 120 to which it is mounted.

In various embodiments, and with reference to FIGS. 4 and 5, the pass-through apertures 165 may be circumferentially spaced apart such that a center pass-through aperture 165A extends through the base portion 132 of the arcuate section 130A substantially at a mid-line between opposing circumferential edges of the arcuate section 130A. The center pass-through aperture 165A, according to various embodiments, may have a radial dimension 168 that is greater than radial dimension of the other pass-through apertures 165B. For example, the center pass-through aperture 165A may be comparatively more elongated in the radial direction and thus may have a racetrack, obround, or egg-like shape. In such a configuration, the spring fastener 140 can move radially within the center pass-through aperture 165A, thereby augmenting the ability of the annular finger seal 130 to radially move in order to accommodate relative radial movement of the combustor transition duct 110 and the turbine vane 120. In various embodiments, the center pass-through aperture 165A may have a circumferential dimension 167 that is less than the other pass-through apertures 165B of the first arcuate section 130A, thereby enabling a substantially tight fit between the spring fastener 140 and the center pass-through aperture 165A and thus preventing circumferential movement of the arcuate section 130A. Such a configuration may ensure adjacent arcuate sections 130A, 130B remain properly aligned and circumferentially distributed during the relative movement of the associated components, thereby preventing formation of a gap between adjacent arcuate sections 130A, 130B that is too wide for the shiplap configuration 131.

Figure 7:
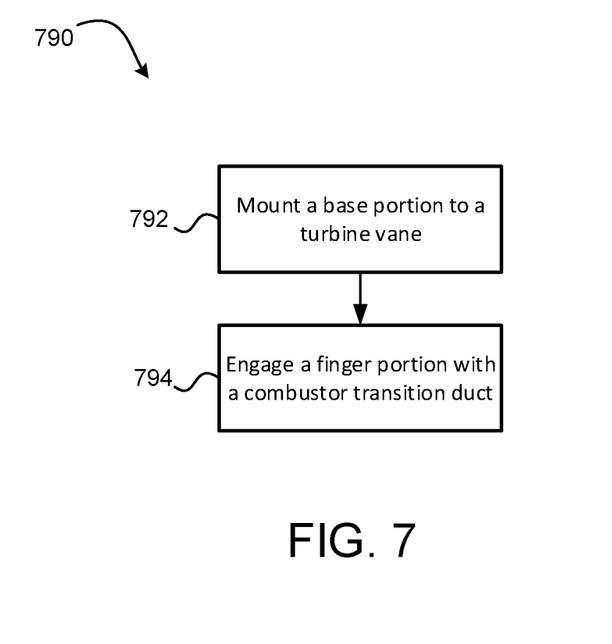
FIG. 7 is a schematic flowchart diagram of a method of manufacturing a gas turbine engine, in accordance with various embodiments.

FIG. 7 is a schematic flowchart diagram of a method 790 of manufacturing a gas turbine engine, in accordance with various embodiments. The method 790 may include mounting the base portion 132 of the annular finger seal 130 to the turbine vane 120 at step 792 and engaging the finger portion 134 of the annular finger seal 130 with the radially inward facing surface 112, relative to the engine central longitudinal axis A-A', of the combustor transition duct 110 at step 794. In various embodiments, mounting the base portion 132 of the annular finger seal 130 at step 792 may include mounting the plurality of arcuate sections 130A, 130B via spring fasteners. In various embodiments, engaging the finger portion 134 of the annular finger seal 130 at step 794 includes deflecting the finger portion of the annular finger seal into a compressed state. Said differently, the annular finger seal 130 may be preloaded such that the fingers 135 of the annular finger seal 130 remain in contact with the combustor transition duct 110.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An annular finger seal comprising:
a base portion defining a base edge of the annular finger seal and comprising a center pass-through aperture, wherein the base edge is continuous; and
a finger portion defining a finger edge of the annular finger seal and comprising a plurality of fingers, wherein the finger edge is segmented by gaps disposed between adjacent fingers of the plurality of fingers;
wherein:
the gaps comprise circumferentially alternating first gaps and second gaps;
the annular finger seal comprises a bend such that the base portion extends in a first direction and the finger portion extends in a second direction different than the first direction; and
the first gaps extend through the bend and thus terminate in the base portion and the second gaps do not extend through the bend and thus terminate in the finger portion before the bend.

2. The annular finger seal of claim 1, wherein a plurality of arcuate sections collectively form the annular finger seal, wherein the base portion is a first base portion and the finger portion is a first finger portion of a first arcuate section of the plurality of arcuate sections.

3. The annular finger seal of claim 2, wherein the plurality of arcuate sections are made from a composite material having a first ply and a second ply.

4. The annular finger seal of claim 3, further comprising a second arcuate section of the plurality of arcuate sections, wherein the first ply and the second ply of each of the first arcuate section and the second arcuate section are circumferentially offset relative to each other such that a first circumferential edge of the first arcuate section shiplaps a second circumferential edge of the second arcuate section.

5. The annular finger seal of claim 2, wherein the center pass-through aperture is a first pass-through aperture, wherein the base portion comprises a second pass-through aperture, wherein the first pass-through aperture and the second pass-through aperture are circumferentially spaced apart, wherein the center pass-through aperture comprises a first radial dimension that is greater than a second radial dimension of the second pass-through aperture.

6. The annular finger seal of claim 5, wherein the first pass-through aperture has a first circumferential dimension that is less than a second circumferential dimension of the second pass-through aperture.

7. The annular finger seal of claim 1, wherein an angle between the first direction and the second direction is between about 75 and 100 degrees.

8. The annular finger seal of claim 1, wherein the gaps terminate in a keyhole formation.

9. The annular finger seal of claim 1, wherein a circumferential dimension of the gaps tapers as the gaps extend from the finger edge towards the base edge.

10. The annular finger seal of claim 1, wherein the finger portion comprises an "s" shape.

11. A gas turbine engine having an engine central longitudinal axis, the gas turbine engine comprising:
   a combustor section;
   a turbine section; and
   an annular finger seal comprising;
      a base portion defining a base edge of the annular finger seal and comprising a first pass-through aperture and a second pass-through aperture;
   wherein a first radial dimension of the first pass-through aperture is greater than a second radial dimension, of the second pass-through aperture; and
      a finger portion defining a finger edge of the annular finger seal and comprising a plurality of fingers;
   wherein:
      gaps are disposed between adjacent fingers of the plurality of fingers;
      each gap of the gaps comprises a terminating formation;
      the terminating formation is at an end of each gap that is disposed toward the base edge;
      the first pass-through aperture and the second pass-through aperture are separate from the gaps disposed between the adjacent fingers of the plurality of fingers;
      the gaps comprise circumferentially alternating first gaps and second gaps;
      the annular finger seal comprises a bend such that the base portion extends in a first direction and the finger portion extends in a second direction different than the first direction; and
      the first gaps extend through the bend and thus terminate in the base portion and the second gaps do not extend through the bend and thus terminate in the finger portion before the bend;
   wherein the annular finger seal is disposed at an adjoining interface between the combustor section and the turbine section, wherein the annular finger seal is mounted to the turbine section and engages a radially inward facing surface, relative to the engine central longitudinal axis, of the combustor section.

12. The gas turbine engine of claim 11, wherein the annular finger seal is mounted to a turbine vane of the turbine section and engages the radially inward facing surface of a combustor transition duct of the combustor section.

13. The gas turbine engine of claim 12, wherein the annular finger seal is preloaded relative to the combustor transition duct to account for relative radial movement of the combustor transition duct such that the annular finger seal remains engaged with the radially inward facing surface of the combustor transition duct during relative radial movement of the combustor transition duct.

14. The gas turbine engine of claim 12, wherein the annular finger seal is mounted to the turbine vane via spring fasteners.

15. The gas turbine engine of claim 11, wherein a first circumferential dimension, as measured in a circumferential direction perpendicular to the radial direction of the first pass-through aperture is less than a second circumferential dimension, also measured in the circumferential direction, of the second pass-through aperture.

* * * * *